June 10, 1924.
E. BOSSI
1,496,806
APPARATUS FOR PREPARING COFFEE
Original Filed May 9, 1922    3 Sheets-Sheet 1
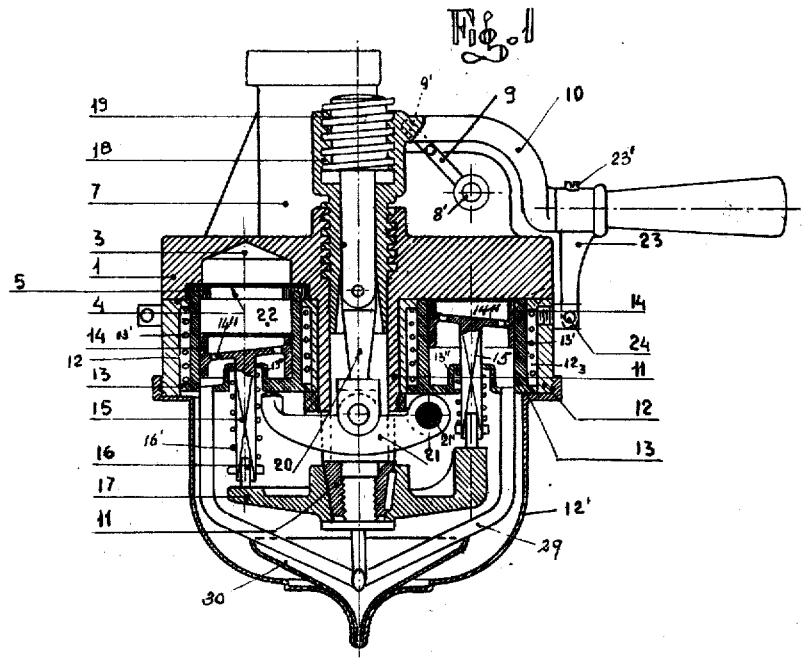
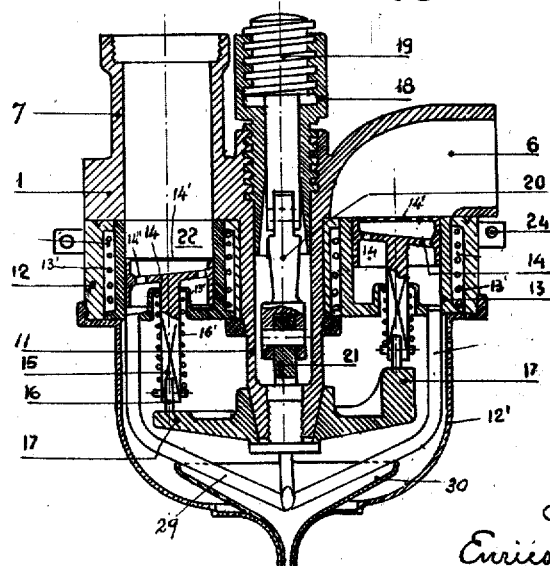

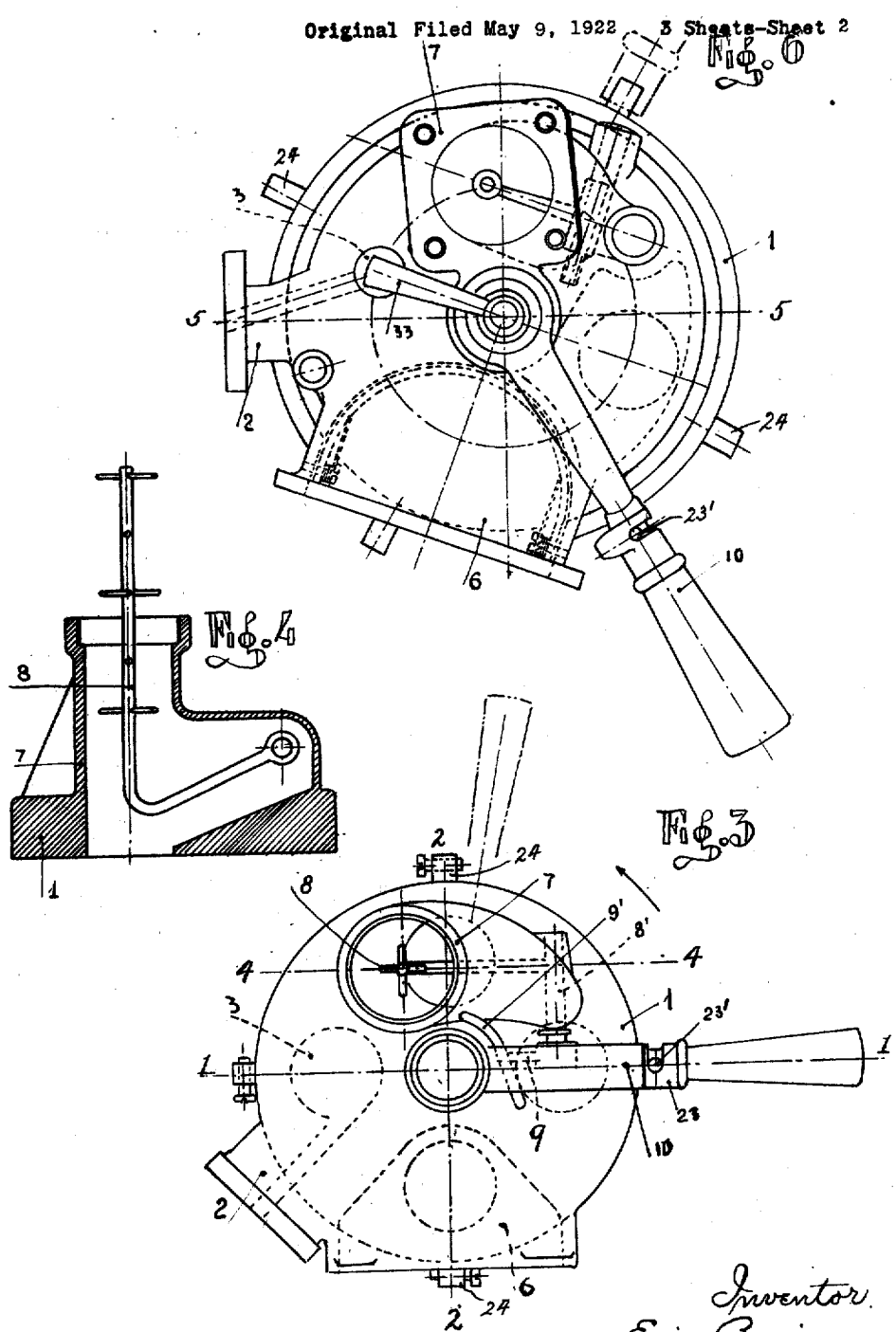

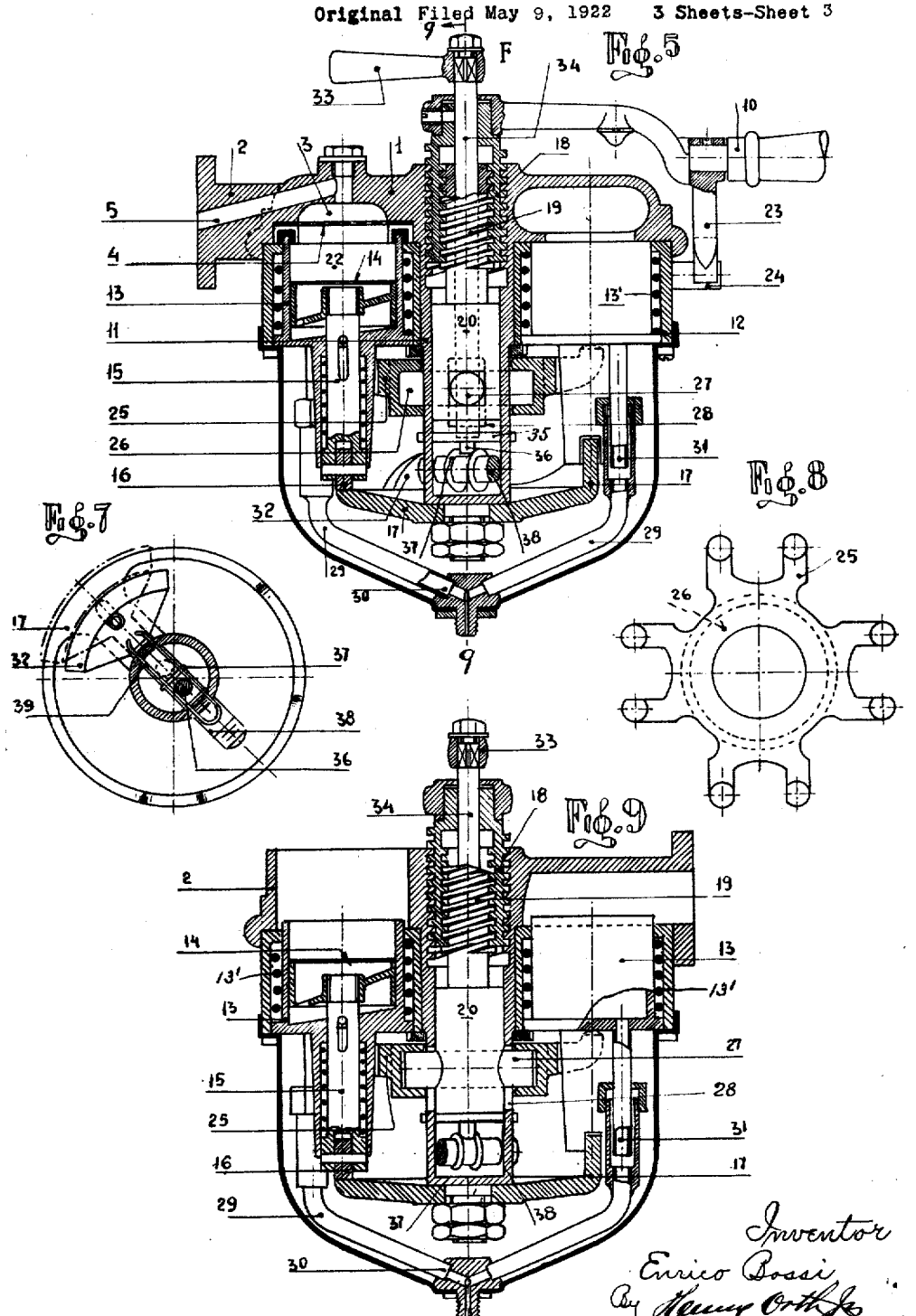

Patented June 10, 1924.

UNITED STATES PATENT OFFICE.

ENRICO BOSSI, OF TURIN, ITALY.

APPARATUS FOR PREPARING COFFEE.

Application filed May 9, 1922, Serial No. 559,541. Renewed April 29, 1924.

*To all whom it may concern:*

Be it known that I, ENRICO BOSSI, a subject of the King of Italy, residing at Turin, Italy, have invented certain new and useful Improvements in Apparatus for Preparing Coffee, of which the following is a full, clear, and exact description.

This invention relates to an apparatus for preparing coffee, which automatically places the ground coffee into a suitable container, then connects this latter to a spray cone for preparing the drink, and subsequently discharges the grounds.

The apparatus can be used in connection with machines or boilers of any kind now employed and comprises a stationary distributing device to be connected with the water and steam supply cocks of the boiler or other device generating boiling water and steam and provided with a spray cone or rose having a lower packing ring, a funnel for filling in the ground coffee, and an exhaust chamber for the grounds. Underneath the distributing device is rotatably mounted a member in which are lodged the containers for the ground coffee, consisting of two hollow pistons, one of which slides within the other. The inner piston is closed at its upper end by a flat strainer and when brought into the lower position, it leaves in the outer piston a free space or chamber. When the member is rotated, the chamber is brought under a funnel and is filled with ground coffee for preparing the drink. The chamber is then brought under a rose or sprinkler and water or steam is supplied by means of the usual supply cocks. When coffee has been prepared the inner piston is brought to its topmost position flush with the upper surface of the rotatable member and the grounds are expelled.

The outer piston sliding in the rotatable member, is normally kept with its rim flush with the top of the latter so that no friction takes place between the outer piston and the distributor during rotation. The outer piston is forced upwards against the spray cone packing, when, owing to the rotation it comes underneath the said rose. The pistons are perforated at their lower ends in order to allow the coffee to flow to the outlet through suitable tubes. A single operating lever is provided for automatically rotating the rotary member and actuating the pistons for filling one of the containers from which the grounds have been previously removed, for removing the grounds from a container having previously served for preparing coffee and for placing a container previously filled with ground coffee against the sprinkler packing.

The device comprises a central screw for lifting the piston situated under the sprinkler and for locking said piston against the spray cone packing. The screw is rotated by the lever which is provided with a handle having a pawl engaging rotary member, so that, by moving the lever in one direction, the piston, situated under the spray cone and having served for preparing coffee is lowered and released, and the rotation of said member through an angle corresponding to the distance between the pistons brings a fresh piston (previously filled with ground coffee) under the spray cone. By moving the lever in the opposite direction, the member remains stationary, and at the end of the lever displacement the outer piston situated under the spray cone is tightly set against the packing thereof, the displacement of the lever varying according to thickness and wear of the packing (as in the ordinary hand operated bags of the hand operated apparatus for preparing coffee), so that a tight joint is secured.

This invention further relates to a device for locking the outer piston situated under the spray cone and for varying the quantity of ground coffee used, as desired.

The accompanying drawings show by way of example two constructional forms of the apparatus.

Figures 1 and 2 are vertical axial sections of the first constructional form, on lines 1—1 and 2—2 respectively of Fig. 3.

Fig. 3 is a top view;

Fig. 4 is a section on line 4—4 of Fig. 3;

Fig. 5 is a vertical axial section of a modified constructional form on line 5—5 of Fig. 6;

Fig. 6 is a plan view;

Fig. 7 is a cross section of a modification;

Fig. 8 is a top view of the device for locking the coffee receptacle under the spray cone; and Fig. 9 is a section on the line 9—9 of Fig. 5.

In the accompanying drawings, the stationary part of the apparatus is in the form of a disc 1 which is connected by a flanged connection 2, (Fig. 3) to the water and steam feeding valves, (not shown) of a known construction. Said disc 1 comprises a spraying cone 3, having a bottom strainer 4 seated on a packing 5, said disc having an outlet conduit 6 through which the grounds are discharged, and an inlet conduit or funnel 7 for filling in the ground coffee, which funnel is provided with a mixing arm 8 operated as hereinafter described.

On the underside of the disc 1 and centrally thereof is formed a cylindrical hub 11, on which is rotatably mounted an annular member 12 having a closed casing 12' mounted on and extending below the same. Seated in the member 12, at equal distances apart, are four cylindrical containers 13. These containers are yieldingly held on their seats by springs 13' which surround the containers and are interposed between internal flanges formed on the upper ends of the seats and external flanges formed on the lower ends of the containers, said springs tending to force the containers downward. Within each container 13 is slidably fitted a piston 14, which carries at its upper end a strainer 14'. Each piston 14 has a perforated partition 14'' forming a movable bottom for the container and is provided with a stem 15 which projects through a hub 13'' of the container 13. Springs 16' surrounding the stems 15 operate to depress the pistons 14 in the containers 13 and each stem carries a roller 16 which is held in contact with a cam 17, secured to the lower end of the hub 11.

The upper end of the hub 11 is internally screw-threaded to receive the externally threaded portion of a bushing 18 which carries an operating lever 10. The upper end of the bushing has internal screw threads which have an inclination opposite to the inclination to its external thread.

A rod, having a screw-threaded head 19 which engages the internal screw threads of the bushing 18, extends through the bushing and has an articulated portion 20 extending into the hub 11 and on the articulated extension 20 is pivotally mounted a lever 21. One end of this lever oscillates on a pin 21', supported in the casing 12', the free end of said lever operating to engage the bottom of the container 13 that is situated under the spraying cone 3, so as to force said container against the packing 5.

The mixing arm 8, in the funnel 7 (Fig. 4) is keyed to a spindle 8' (Figs. 1 and 3) which is journaled in a support on the disc 1, and has a crank-arm 9 terminating in an end member 9'. This end member is so formed that when the operating lever 10 is moved in one direction it engages and depresses the end member 9' thereby rocking the spindle 8' and lowering the arm 8. When the lever 10 is moved in the opposite direction the arm is lifted under the action of a return spring, (not shown). The operating lever 10 is provided with a pawl 23 which is free to turn in one direction and is prevented from turning in the opposite direction by a pin 23'. This pawl co-operates with two projections 24 on the rim of the annular member 12.

The apparatus works as follows:

When a container 13 is situated under the funnel 7, the ground coffee falls through this latter filling the free chamber 22 above the strainer 14'.

By moving the operating lever 10 in the direction of the arrow from the position shown in full lines in Fig. 3 to the position shown in dotted lines the pressure of the lever 21 decreases. The pawl 23 on the lever 10 engages projection 24 of the annular member 12 and forces the latter to turn 90° with the lever so that a container 13 is thus brought under the spray cone 3.

By returning the lever 10 to its former position, the pawl 23 is released from the projection 24 and the bushing 18 connected to said lever rotates in the disc 1 and is lifted while the head 19 not following the rotation of the bushing is also lifted so that lever 21 will swing on its pivot and strongly press the container 13 against the packing 5 of the spray cone.

By operating the inlet valves for the hot water and steam (not shown on the drawing), the infusion of coffee is prepared in the known manner. The liquid, after having filtered through the ground coffee contained in the chamber 22 collects on the bottom of the container 13 and is conveyed through a tube 29 to a funnel 30.

By returning the lever 10 to the dotted line position, the container 13, containing the grounds is brought under the discharge outlet 6. During this stroke, the roller 16, of the stem 15 of the strainer holder 14 slides on the cam 17 and is raised by the latter forcing the grounds towards the discharge opening 6. When acting again upon the lever 10, the container 13 comes under the funnel and a new cycle begins.

If the containers are four in number, as in the construction shown, there will be one container for each stroke, and coffee will be prepared at each reciprocating motion of the lever 10.

Figs. 5, 6, 7, 8 and 9 show a modified form for preparing coffee for one or two at a time; similar parts are indicated by the same reference numerals throughout the drawing.

The modified form shows a different locking device of the container 13.

In the constructional form described above, the containers are locked by means of the lever 21 thus causing a certain lateral pressure to be exerted on the bottom of the containers.

In the modified form described hereafter the pressure is exerted axially on the containers 13 and for this purpose there is provided a frame 25 (shown in detail in Fig. 8) which consists of four fork shaped arms surrounding the stems 15 and resting upon the containers 13. The frame 25 is formed with an annular chamber 26 into which project the ends of a pin 27 passing through a rigid rod 20 and through slots 28 in the hub 11, so that said frame 25 is capable of axial displacement but is prevented from turning.

When the annular member 12 is rotated, it carries along the frame 25, and when the lever 10 is displaced from the dotted line position the frame 25 is lifted (axially) until it reaches the lower ends of the containers 13.

By further operating the lever 10, the container situated between the funnel and the discharge opening is kept in its lower position by the fixed disc 1, while the containers situated underneath the discharge opening and the funnel respectively can be raised, and the fourth container is pressed against the packing with the result that the stress on the screw is transmitted on to the containers beneath the funnel and discharge opening.

As shown in the drawing, the right handed and left handed threads of the bushing are brought to the same level in order to reduce the height of the apparatus.

The device for varying the quantity of ground coffee consists of an auxiliary cam 32, radially movable on the cam 17, in such manner that when it is brought on the surface on which the rollers 16 move, it acts upon the piston 14 which is situated below the hopper or funnel 7, and partly lifts it in order to diminish the capacity of the chamber 22 in a predetermined measure. The arrangement and the shape of the auxiliary cam are such that the piston is raised, when it is going to set free the hopper, so that part of the ground coffee is again forced into the hopper, while the desired quantity remains in the receptacle 22.

The segment 32 is operated by means of a handle 33 keyed to a vertical shaft 34 passing through the pin 27 and terminating with an eccentric 35, having a pin 36 engaged between the flanges 37 situated on the tail 38 of the circular segment 32.

By causing the lever 33 to accomplish half a turn, the segment 32 is displaced radially and is brought on the tappet path.

A spring 39 (Fig. 7) tends to keep the pin 36 in its end positions.

I claim:

1. An apparatus for preparing coffee, comprising a distributing device having receiving and discharge openings therein, a fluid supply chamber between said openings, a rotary member mounted beneath the distributing device, containers mounted in the rotary member, and means to actuate the latter to bring the containers successively in operative relation with said openings and with the fluid supply chamber.

2. An apparatus for preparing coffee, comprising a stationary member, a spraying chamber formed therein, a filling conduit and a discharge conduit in said member, a rotary member mounted beneath the stationary member, containers mounted in the rotary member, means to actuate the latter to successively position the containers in operative relation to the conduits and to the spraying chamber, and mechanism for discharging the contents of the containers into the discharge conduit.

3. An apparatus for preparing coffee comprising a stationary member, a conical spraying chamber formed therein, a supply funnel and a discharge conduit in said member, an annular member rotatably mounted beneath the stationary member, cylindrical containers movably mounted in the annular members and adapted to be successively brought into operative relation to the funnel, chamber, discharge conduit, and a piston in each container adapted to discharge the contents of the latter into the discharge conduit.

4. An apparatus for preparing coffee, comprising a stationary member, a supply funnel, and a discharge conduit in said member, a spraying chamber between the funnel and conduit, an annular member rotatably mounted beneath the stationary member, cylindrical containers mounted in and movable axially of the annular member, means to form a fluid tight connection between the containers and the spraying chamber, an axially movable member mounted in each container and forming a bottom therefor, and means to bring the containers successively into operative relation to the funnel, spraying chamber and discharge conduit.

5. An apparatus for preparing coffee, comprising a stationary member, a supply funnel, and a discharge conduit in said member, a spraying chamber between the funnel and conduit, an annular member rotatably mounted beneath the stationary member, cylindrical containers mounted in and movable axially of the annular member, means to form a fluid tight connection between the containers and the spraying chamber, a strainer in the bottom of the latter, an axially movable member mounted in each container and forming a bottom therefor, and means to bring the containers successively into operative relation to the funnel, spraying chamber and discharge conduit.

6. An apparatus for preparing coffee, comprising a stationary member, a supply funnel, and a discharge conduit in said member, a spraying chamber between the funnel and conduit, an annular member rotatably mounted beneath the stationary member, cylindrical containers mounted in and movable axially of the annular member, means to form a fluid-tight connection between the containers and the spraying chambers, an axially movable member mounted in each container and forming a bottom therefor, means to bring the containers successively into operative relation to the funnel, spraying chamber and discharge conduit, and means to reciprocate the bottom members to successively receive and discharge the contents of the containers.

7. An apparatus for preparing coffee comprising a stationary member, a supply funnel, and a discharge conduit in said member, a spraying chamber between the funnel and conduit, an annular member rotatably mounted beneath the stationary member, cylindrical containers seated in the annular member, means for yieldingly seating the containers, a packing interposed between the spraying chamber and containers, means for moving the latter against the packing, an axially movable member mounted in each container and forming a bottom therefor, means to normally depress the bottom members, and means to successively bring the containers in operative relation to the funnel, spraying chamber and discharge conduit.

8. An apparatus for preparing coffee comprising a stationary member, a supply funnel, and a discharge conduit in said member, a spraying chamber between the funnel and conduit, an annular member rotatably mounted beneath the stationary member, cylindrical containers seated in the annular member, means for yieldingly seating the containers, a packing interposed between the spraying chamber and containers, means for moving the latter against the packing, an axially movable member mounted in each container and forming a bottom therefor, means to normally depress the bottom members, means to successively bring the containers in operative relation to the funnel, spraying chamber and discharge conduit, and means to raise the bottom members to discharge the contents of the containers.

9. An apparatus for preparing coffee comprising a stationary member, a supply funnel, and a discharge conduit in said member, a spraying chamber between the funnel and conduit, an annular member rotatably mounted beneath the stationary member, means for yieldingly seating the containers, a packing interposed between the spraying chamber and containers, means for moving the latter against the packing, an axially movable member mounted in each container and forming a bottom therefor, means to normally depress the bottom members, means to successively bring the containers in operative relation to the funnel, spraying chamber and discharge conduit, means to raise the bottom members to discharge the contents of the containers, and a discharge conduit connected with the bottoms of each container.

10. An apparatus for preparing coffee comprising a stationary member, a supply funnel, and a discharge conduit in said member, a spraying chamber between the funnel and conduit, a screen in the bottom of the chamber, a packing below the screen, a hub on the stationary member, an annular member rotatable on the hub, a plurality of cylinders mounted in and movable axially of the annular member, springs surrounding the cylinders for normally depressing the same, a piston slidable in each cylinder, a transverse perforated partition in each piston, a stem on each piston extending through the bottom of the cylinder, a spring for normally depressing the piston, means for bringing the cylinders successively beneath the funnel, spraying chamber and conduit, means for raising the cylinders into engagement with the packing, and means for raising the pistons to discharge the contents of the cylinders.

11. In an apparatus for preparing coffee, a stationary member, an annular member mounted beneath the latter, containers axially movable in the annular member, means for supplying coffee and fluid to the containers, a discharging device in each container, a lifting member mounted beneath the containers, a rotatable axially movable member mounted in said stationary member, means connecting the axially movable member and the lift-member adapted to raise and lower the latter into and out of contact with the containers, an operating lever conected to the axially movable member, and means on the lever and annular member co-operating to rotate the latter.

12. In an apparatus for preparing coffee, a stationary member, an annular member mounted beneath the latter, containers axially movable in the annular members, means for supplying coffee and fluid to the containers, a discharging device in each container, a lifting member mounted beneath the containers, a rotatable axially movable member mounted in said stationary member, means connecting the axially movable member and the lifting member adapted to raise and lower the latter into and out of contact with the containers, an operating lever connected to the axially movable member, means on the lever and annular member co-operating to rotate the latter, and means operated by the movement of the annular member to actuate the discharge device.

13. In an apparatus for preparing coffee, a stationary member, an annular member mounted beneath the latter, containers axially movable in the annular member, means for supplying coffee and fluid to the containers, a discharge device in each container, a lever pivoted at one end beneath the containers, a bushing having an external threaded portion rotatably mounted in the stationary member, a screw mounted in the bushing having threads thereon oppositely inclined to said external threads and engaging an internal threaded portion of said bushing, an articulated connection between the screw and lever, an operating lever on the bushing for rotating the latter, and a pawl on the operating lever adapted to engage projections on the annular members.

In testimony that I claim the foregoing as my invention, I have signed my name.

ENRICO BOSSI.